No. 814,991. PATENTED MAR. 13, 1906.
A. C. STEWART.
AUTOMOBILE ENGINE SUSPENSION.
APPLICATION FILED MAR. 1, 1905.

Witnesses

Inventor
Alfred C. Stewart
by Townsend Bros. Attys.

UNITED STATES PATENT OFFICE.

ALFRED C. STEWART, OF LOS ANGELES, CALIFORNIA.

AUTOMOBILE-ENGINE SUSPENSION.

No. 814,991.  
Specification of Letters Patent.  
Patented March 13, 1906.

Application filed March 1, 1905. Serial No. 247,879.

*To all whom it may concern:*

Be it known that I, ALFRED C. STEWART, a citizen of the United States, residing at Los Angeles, in the county of Los Angeles, State of California, have invented new and useful Improvements in Automobile-Engine Suspensions, of which the following is a specification.

The main object of this invention is to provide an automobile suspension by means of which the strain will be applied in the most favorable manner both to the engine and to the automobile-frame.

A further object of the invention is to provide a suspension of this character which will be of minimum weight and simple construction, and in this construction an important object is to dispense with the use of a subframe for supporting the engine.

Another object of the invention is to so construct the suspension that the various parts thereof can be readily attached or disconnected, if desired, and which will facilitate access to the engine for inspection and repairs.

The accompanying drawings illustrate the invention.

Figure 1:
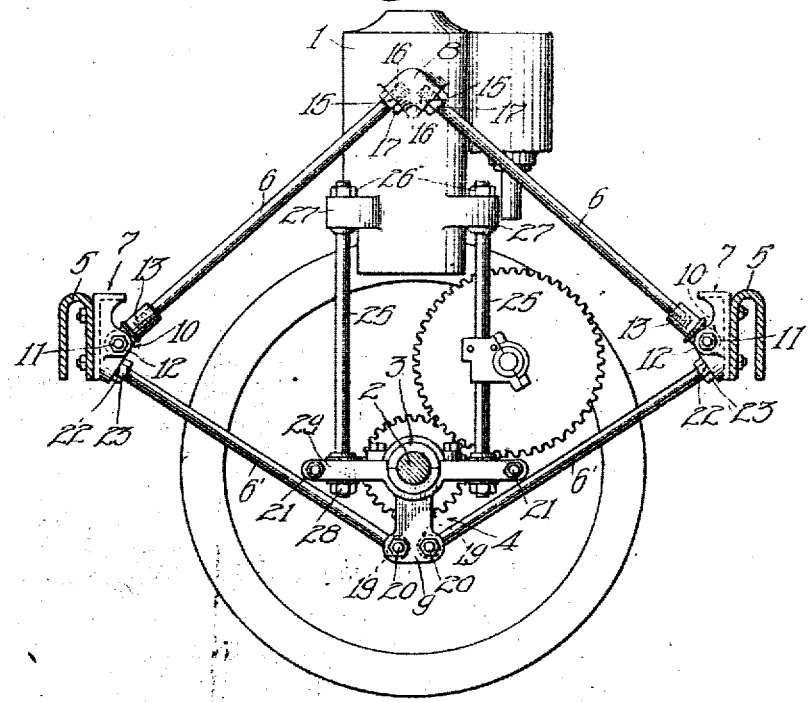
Figure 2:
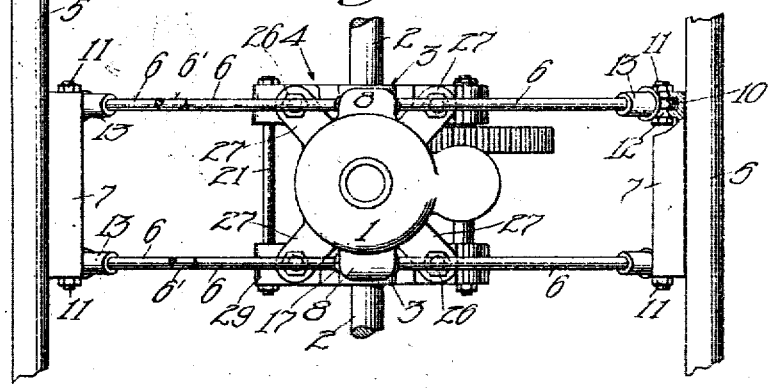

Figure 1 is a side elevation showing the automobile truck-frame in section. Fig. 2 is a plan, partly broken away.

1 designates the body of the engine, which may be of any suitable type, being here shown as a vertical engine; 2, the main shaft thereof; 3, the bearing for the shaft, and 4 the framing connecting the shaft with the bearing, the parts 1 and 4 constituting what will herein be termed the "engine-frame." It may be understood that this may be the frame of one or more engines, according to the number of engines used.

5 designates side bars of the automobile-frame, which may be of any usual form. The engine and its frame are connected to and supported on the automobile-frame member 5 by means of a truss. Said truss may be in duplicate, a truss-frame being provided at each side of the engine, each truss-frame comprising upper and lower truss members, the upper truss member consisting of truss-rods 6, having a bearing at their lower ends on brackets 7, attached to the automobile members 5, and a bearing at their upper ends against suitable abutment means 8 on the engine, and the lower truss-frame member 6', consisting of the rods or bars connected at their upper outer ends to the brackets 7 aforesaid and at their lower ends to a bracket or frame portion 9, attached to the lower end of the engine-frame.

The engine-frame constitutes the cross member of the truss connecting the lower and upper members thereof. The connection of the upper truss members to the brackets 7 may be by means of eyes 10 on said truss members engaging with bolts or pins 11 in said brackets, the brackets having ears or lugs 12 embracing the said eyes and receiving said pins or bolts. The eyes 10 may be formed on the members 13, screwing on the ends of rods or bars 6. Said rods or bars may screw at their upper ends into the abutment 8, which may be formed as a lug projecting from the side of engine 1 and having opposite inclined faces 15, into which tapped openings 16 are bored upwardly in a converging direction to receive the rods 6. 17 designates lock-nuts on the rods 6, engaging with the faces 15.

The lower truss members 6' may be provided with eyes 19 at their lower ends engaging with pins or bolts 20 in a bracket 9, extending downwardly from the engine-frame, said bracket having ears or lugs embracing said eyes. Said truss members are formed as rods, which at their upper ends may screw into tapped openings extending upwardly at an angle into the brackets 7, said brackets having inclined faces 22, against which bear lock-nuts 23.

The engine-frame may be of any suitable construction, comprising, for example, vertical frame-bars 25, secured by nuts 26 to lugs 27 on the engine-frame, and by nuts 28 to an end frame member 29, carrying the bearing 3 for the main shaft 2 and also carrying the end truss-supporting bracket or bearing 9, to which the lower truss members 6' are connected. 21 designates cross-bars connecting the two sides of the engine-frame.

It will be noted that the above-described construction gives support both to the upper and lower portions of the frame, thereby holding the same effectually against vibration and preventing strains on the supporting parts such as would result from the to-and-fro vibration of an engine-frame supported only at one end. While the truss suspension gives an effectual support for the vertical thrust due to the weight of the engine, it is also particularly effective in resisting the strains due to the rotative or torsional effect of the engine's operation. It will be noted in this connection that the lower truss member 6' extends substantially in the line of such rotative strain, so as to effectually resist the same and enable such members to be made of minimum weight and size. The screw connections of the truss-frame members may serve for adjustment of the engine—for example, for bringing it to true vertical position.

What I claim is—

1. In an automobile, the combination with an automobile engine-frame and supporting members therefor on the automobile, of a truss supporting the engine-frame on said supporting members and comprising upper truss members extending obliquely downward from the upper part of the engine-frame to said supporting members, and lower truss members extending obliquely upward from the lower part of the engine-frame to said supporting members.

2. The combination with an automobile engine-frame having abutments at its upper portion, and automobile frame members, of truss means supporting the engine-frame on said automobile frame members and comprising upper truss members engaging the abutments on the engine-frame and extending obliquely downward therefrom and engaging at their lower ends with the said automobile frame members.

3. The combination with an automobile engine-frame having abutments at its upper portion, and automobile frame members, of truss means supporting the engine-frame on said automobile frame members and comprising upper truss members engaging the abutments on the engine-frame and extending obliquely downward therefrom and engaging at their lower ends with the said automobile frame members, and lower truss members connected to the lower end of the engine-frame and extending obliquely upward and outward therefrom and connected at their upper ends to the automobile frame members.

4. The combination with an automobile engine-frame having abutments at its upper portion and automobile frame members, of truss means supporting the engine-frame on said automobile frame members and comprising upper truss members engaging the abutments on the engine-frame and extending obliquely downward therefrom and engaging at their lower ends with the said automobile frame members, and lower truss members connected to the lower end of the engine-frame and extending obliquely upward and outward therefrom and connected at their upper ends to the automobile frame members, the connections at one end of said members being adjustable.

5. The combination with an automobile engine-frame having abutments at its upper portion, and automobile frame members, of truss means supporting the engine-frame on said automobile frame members and comprising upper truss members engaging the abutments on the engine-frame and extending obliquely downward therefrom and detachably engaging at their lower ends with the said automobile frame members.

In testimony whereof I have hereunto set my hand, at Los Angeles, California, this 10th day of February, 1905.

ALFRED C. STEWART.

In presence of—
ARTHUR P. KNIGHT,
JULIA TOWNSEND.